United States Patent
Pearson (10) Patent No.: US 10,839,079 B2
(45) Date of Patent: *Nov. 17, 2020

(54) SYSTEMS AND METHODS FOR TAMPER-RESISTANT VERIFICATION OF FIRMWARE WITH A TRUSTED PLATFORM MODULE

(71) Applicant: Timothy Raymond Pearson, Boone, IL (US)

(72) Inventor: Timothy Raymond Pearson, Boone, IL (US)

(73) Assignee: Raptor Engineering, LLC, Belvidere, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/735,931

(22) Filed: Jan. 7, 2020

(65) Prior Publication Data
US 2020/0143056 A1    May 7, 2020

Related U.S. Application Data

(63) Continuation of application No. 15/798,591, filed on Oct. 31, 2017, now Pat. No. 10,621,351.

(60) Provisional application No. 62/415,965, filed on Nov. 1, 2016.

(51) Int. Cl.
| | | |
|---|---|---|
| *G06F 21/57* | (2013.01) | |
| *G06F 21/60* | (2013.01) | |
| *H04L 9/08* | (2006.01) | |
| *H04L 9/32* | (2006.01) | |
| *G06F 9/4401* | (2018.01) | |
| *G09C 1/00* | (2006.01) | |

(52) U.S. Cl.
CPC ............ *G06F 21/57* (2013.01); *G06F 21/575* (2013.01); *G06F 21/602* (2013.01); *G09C 1/00* (2013.01); *H04L 9/083* (2013.01); *H04L 9/3234* (2013.01); *G06F 9/4401* (2013.01); *H04L 2209/127* (2013.01)

(58) Field of Classification Search
CPC ....... G06F 21/57; G06F 21/602; G06F 21/575
See application file for complete search history.

(56) References Cited

U.S. PATENT DOCUMENTS

| | | | | |
|---|---|---|---|---|
| 6,950,867 | B1* | 9/2005 | Strohwig | G06F 21/10 709/223 |
| 7,444,601 | B2* | 10/2008 | Proudler | G06F 21/34 713/150 |
| 8,560,845 | B2* | 10/2013 | Krsti | G06F 21/44 713/161 |
| 9,866,392 | B1* | 1/2018 | Campagna | H04L 9/3247 |
| 10,318,737 | B2* | 6/2019 | Liguori | H04L 63/0823 |
| 2005/0204155 | A1* | 9/2005 | Ravi | G06F 21/85 726/22 |
| 2009/0019285 | A1* | 1/2009 | Chen | G06F 21/575 713/175 |
| 2011/0320760 | A1* | 12/2011 | Cummins | G06F 13/4054 711/206 |

(Continued)

*Primary Examiner* — Ali Shayanfar
(74) *Attorney, Agent, or Firm* — Pierson Intellectual Property LLC (57) ABSTRACT

Systems and methods for tamper-resistant verification of firmware with a trusted platform module. Embodiments may be configured to ensure the integrity of computer system firmware while still allowing reprogramming of nonvolatile storage devices with arbitrary information.

10 Claims, 4 Drawing Sheets

(56) References Cited

U.S. PATENT DOCUMENTS

| | | | |
|---|---|---|---|
| 2016/0283411 A1* | 9/2016 | Sheller | G06F 21/57 |
| 2016/0350536 A1* | 12/2016 | Grimes | G06F 21/71 |
| 2017/0237560 A1* | 8/2017 | Mueller | G06F 8/63 |
| | | | 713/168 |
| 2018/0157839 A1* | 6/2018 | Pearson | G06F 21/602 |
| 2018/0176775 A1* | 6/2018 | Obaidi | H04W 76/10 |
| 2018/0330093 A1* | 11/2018 | Shivanna | G06F 21/575 |
| 2019/0087575 A1* | 3/2019 | Sahita | G06F 21/53 |

* cited by examiner

SYSTEMS AND METHODS FOR TAMPER-RESISTANT VERIFICATION OF FIRMWARE WITH A TRUSTED PLATFORM MODULE

CROSS-REFERENCE TO RELATED APPLICATIONS

This application claims a benefit of priority under 35 U.S.C. § 119 to Provisional Application No. 62/415,965 filed on Nov. 1, 2016, which is fully incorporated herein by reference in its entirety.

BACKGROUND INFORMATION

Field of the Disclosure

Examples of the present disclosure are related to systems and methods for tamper-resistant verification of firmware with a trusted platform module, wherein a field programmable gate array (FPGA) with an internal secret key is positioned between general system logic, platform firmware storage, and a trusted platform module (TPM).

Background

In computing, booting or booting up refers to the initialization of a computerized system, such as a computer, computer appliance, and may use software, firmware, etc. When booting, firmware may be used to perform hardware initialization to provide services for operating systems and programs. This firmware may initialize and test the system hardware components. Because the firmware initializes and tests the systems hardware components, it is desired to verify the boot process while still allowing for modification of the firmware by an authorized party.

Existing solutions to verify the boot process rely on a Trusted Platform Module (TPM) used in conjunction with an external Core Root of Trust/Measurement (CRTM), which is typically implemented as a software or firmware block executing on the platform CPU or coprocessor. Typically, the CRTM firmware is stored on the same storage device as the firmware that will be verified. As a result of the placement of these elements, an unauthorized party with physical access to the storage device can alter the CRTM. Altering the CRTM may cause the CRTM to falsely validate unauthorized code. Furthermore, unauthorized hardware or software that may intercept and/or provide signals to the TPM that mimic an authorized boot sequence. These flaws have required a TPM and CRTM, along with the general purpose computing platform serviced by these two components, to be positioned in highly secured physical environments, which negates the benefits of the TPM.

Alternatively, manufacturers may permanently build the CRTM into a chip via a mask ROM. This prevents extending and/or subverting the functionality of the CRTM, but relies on no bugs or other issues in the on-die CRTM firmware. If there are exploits, bugs, or other issues with the CRTM firmware, the computer is rendered permanently unsecure.

Other manufactures require a fixed signing key to load the CRTM firmware and/or initialize the firmware to initialize the computer. However, this does not allow owner or owner-authorized modifications of the firmware to initialize the computer without direct vendor intervention, prevents the machine owner from fixing known bugs without direct vendor cooperation, and creates an insecure back door that can be used by any parties knowing the fixed signing keys.

Accordingly, needs exist for more effective and efficient systems and methods for tamper-resistant verification of firmware with a trusted platform module.

SUMMARY

Embodiments disclosed herein describe systems and methods for tamper-resistant verification of firmware with a trusted platform module (TPM). Embodiments may be configured to ensure the integrity of computer system firmware, while allowing reprogramming of nonvolatile storage devices with arbitrary information, such as firmware enforcing the use of an internal key signature. Embodiments may be permanently integrated onto a computer system's printed circuit board, and be configured to detect if the device has been physically tampered with. If it is determined that the device has been physically tampered with, embodiments may delete the internal secret key on the detection of the physical tampering.

Embodiments may be configured to operate by placing both a cryptographic processor and the internal secret key within a FPGA and a TPM into a shielded, tamper resistant area of the printed circuit board, wherein a firmware storage device may be located outside of the tamper resistant area. In embodiments, access to the TPM and the firmware storage device may be handled through the FPGA, wherein there may be no direct access to the TPM or firmware storage device by a host system or general logic system. Additionally, communications between the general logic system and FPGA may be physically safe from probing.

In embodiments, the FPGA may store the internal secret key in soft logic, such that the secret key is lost if power is removed from the FPGA. Therefore, the secret key may not be extracted from the field programmable gate array as it is stored in internal soft logic, and not in the logic definition "bit stream", and is randomly generated by soft logic inside the FPGA immediately after programming is complete.

In embodiments, the FPGA may monitor the status of electrical tamper detection signals, and erase its internal key responsive to detection of tampering or an attempt at tampering with the contents of the protected area.

In other embodiments, a ball grid array or similar physical package with connections physically obscured by the device packaging may be used for the TPM and the key storage FPGA. Connections to embodiments may be physically secure from probing by placement in middle layers of the printed circuit board, and/or by the use if blind and buried vias if the secured traces change layers. In these embodiments, a tamper detection circuit may be configured to clear secret data either ball grid array device is removed from the printed circuit board.

In other embodiments, TPM functionality may be implemented by the key storage and processing FPGA, or by an additional FPGA placed within the shielded area.

A dynamic chain of trust may be initiated when an operating system invokes a special security instruction, which resets platform configuration registers to their default values and starts a measured launch. A first measurement may occur by hardware, such as a processor, or by software running on a processor, such as firmware, to measure a signature provided by the manufacturer. This may be known as a dynamic root of trust measurement (DRTM), and is normally executed by the CRTM implementation. In embodiments, responsive to detecting a dynamic root of trust measurement request, the FPGA within a shielded area may immediately transmit the dynamic root of trust measurement request to the TPM. The FPGA may then load the CRTM area of the firmware into internal memory, compute a cryptographic hash of the loaded firmware, sign the cryptographic hash of the loaded firmware using an internal secret key, and load the platform configuration registers of the TPM with the signed hash and/or portions of the signed hash.

In embodiments, all requests by the host for read access to the CRTM area of the firmware may be intercepted by the FPGA. An internal, authenticated copy of a corresponding firmware region of the CRTM is used to return the requested data, wherein write commands may be discarded. However, this safety mechanism may be disabled by a host using a dedicated command, e.g. for reprogramming host-based firmware. The status of the safety mechanism may be reported to the host on request, and/or used to alter the TPM PCRs responsive to the current state of the FPGA. Status flags may be reported as part of the plaintext signed by the FPGA using its internal secret key.

To this end, embodiments may be configured to allow an authorized user to alter the firmware by making the CRTM subject to measurement by an external, trusted hardware, a secure system may be established even if potentially malicious physical access to the computing device occurs.

In embodiments, the FPGA actively computes verification hashes of the partial or complete contents of the system firmware storage devices.

In embodiments, the FPGA actively computes verification hashes of the partial or complete contents of any internal shadow storage devices used to mirror system firmware into the protected region.

In embodiments, the FPGA reports internal values, for example firmware hashes, to the general purpose logic system on request.

In embodiments, the FPGA computes and communicates to the general purpose logic system a cryptographic signature of the data block being provided to the general purpose logic system, where said data block includes a single-use cryptographic nonce provided by the general purpose logic system, and where said signature is generated using the FPGA's internal secret key.

In embodiments, the FPGA tracks the current state of the system, for example monitoring power, reset, firmware override, and other platform-level signals. The FPGA assembles the current state of these signals into a value or values that are communicated to the general system logic upon request. Further, the FPGA signs the current state of these values with its internal secret key for attestation purposes.

In embodiments, the FPGA assembles the current state of its internal security software flags and hardware signals into a value or values which are communicated to the general system logic upon request Further, the FPGA signs the current state of these values with its internal secret key for attestation purposes.

In embodiments, the FPGA monitors the current power state of the general system logic and switches into a low-power mode when the host is powered down, wherein internal clocks may be slowed and/or voltages may be decreased and/or turned off to sections of or to the entirety of the secure area in an effort to conserve electrical energy.

In other embodiments, the secure area may be placed on a removable device that plugs in to a host general purpose logic system, and the removable device associated with the secure area detects when the removable device is plugged into or unplugged from a general purpose logic system. The removable device may contain sufficient electrical storage to keep the FPGA and its monitoring circuits active for a reasonable amount of time, thus allowing the host to be powered down and unplugged while maintaining security state. Alternatively or in addition to any on-board energy storage, the module may access external energy storage on the general purpose logic system for the same purpose. Responsive to unplugging from the general purpose logic system, the FPGA may erase its internal secret keys and/or otherwise report the tampering to a host application, with no ability to reset the internal tamper detection flag unless a new internal secret key is generated. Responsive to plugging in to a general purpose logic system, the FPGA may generate a new internal secret key automatically, and start monitoring of its environment, for instance via tamper detection hardware.

In embodiments, the secure area provides hardware to read the contents of the FPGA's bitstream storage device from outside the protected region, without allowing the FGPA's bitstream storage device to be reprogrammed.

In embodiments, the FPGA's bitstream storage device may be reprogrammed from outside the protected area, with the FPGA held in reset by hardware contained inside the protected area while the reprogramming occurs. In embodiments, this may be via a dedicated reprogramming mode that both enables write access to the storage device and holds the FPGA in reset responsive to an external signal and/or switch.

In further embodiments, embodiments may allow a minimum trusted image (MTI), possibly in the form of software running on the general system logic, to generate a cryptographic key pair, then the general system logic may upload the public key of the key pair into the FPGA. The key pair located on the FPGA may be locked at any point. Once the key pair is locked, the general system logic must be reset, via a reset button or power cycle, to unlock the locked key pair stored at the FPGA. This locking may prevent the key from being changed, but allows the public key to be freely read.

In embodiments, the stored key may also be part of a plaintext that is signed by the FPGA when the FPGA authenticates itself to the end user. For example, during a boot procedure an FPGA may authenticate the MTI firmware. The MTI firmware may generate a SSH key pair that is uploaded into the FPGA, and the SSH key pair uploaded onto the FPGA is then locked.

At a client connection, the FPGA may determine that the key pair is valid and locked, authenticate the key pair and attestation status, and the SSH public key may be used to authenticate the MTI logic and/or software on a remote host.

To this end, embodiments may bootstrap the chain of trust to a higher level application, such as SSH), which may eliminate Man in the Middle (MITM) attacks.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Embodiments disclosed herein describe systems and methods for tamper-resistant verification of firmware with a trusted platform module. Embodiments may be configured to ensure the integrity of computer system firmware while still allowing reprogramming of nonvolatile storage devices with arbitrary information.

Figure 1:
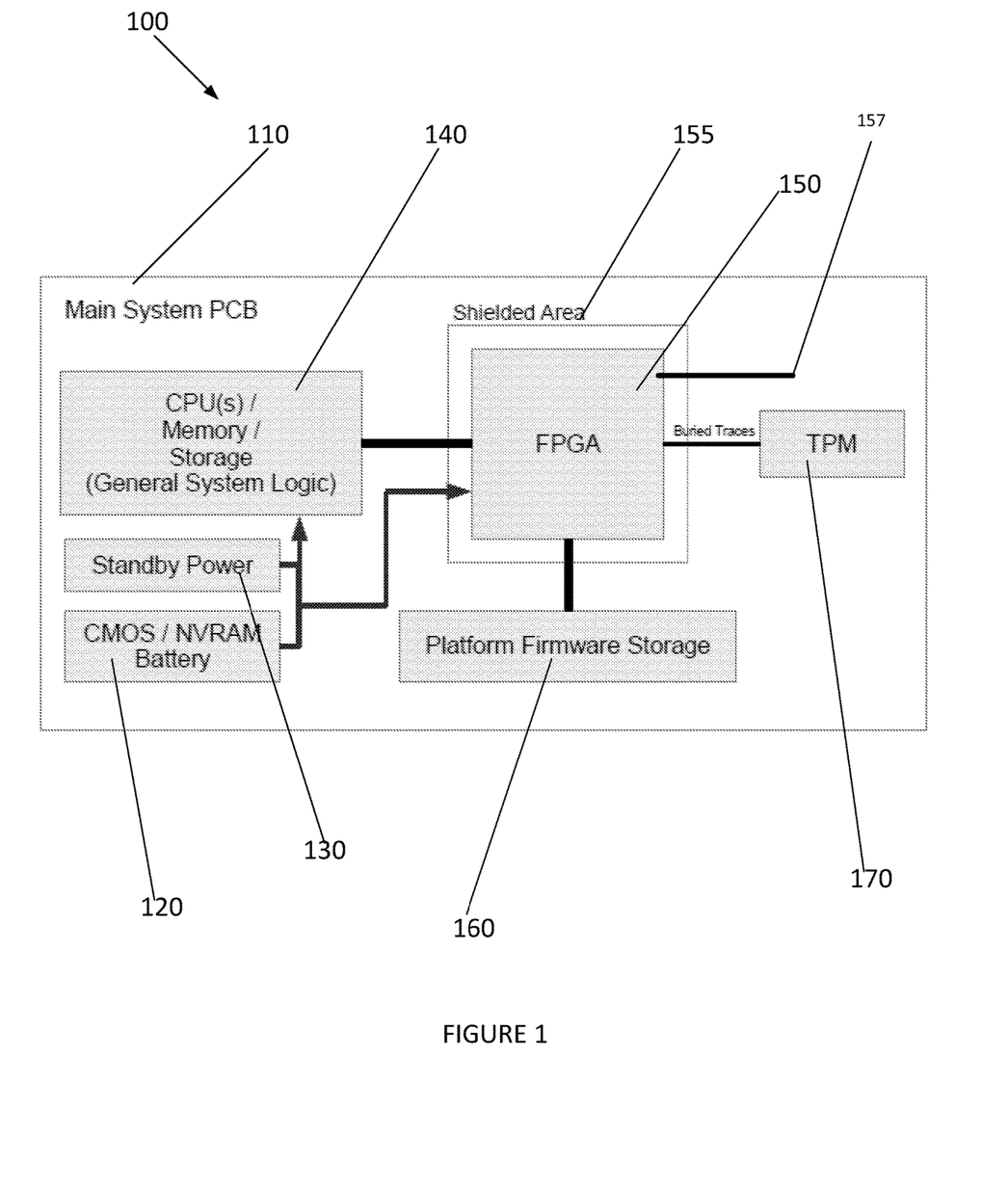
FIG. 1 depicts a topology for tamper-resistant verification system, according to an embodiment.

Turning now to FIG. 1, FIG. 1 depicts a topology for tamper-resistant verification system 100, according to an embodiment. System 100 may include a printed circuit board 110, wherein printed circuit board includes a battery 120, standby power 130, general logic system 140, field programmable gate array (FPGA) 150 within shielded area 155, platform firmware storage 160, and TPM 170.

Printed circuit board 110 may be an electronic circuit that includes thin strips of conducting material that have been etched from a layer fixed to a flat insulated sheet. Printed circuit board 110 may allow the elements of system 100 to be electronically coupled to each other.

Battery 120 may be a CMOS and/or NVRAM battery, which may be configured to control the time, date, hard disk, and other configurations settings. Battery 120 may also be configured to be a battery for NVRAM that retains its information when power is turned off. In embodiments, battery 120 may be electronically coupled to general logic system 140 and FPGA 160.

Standby power 130 may be electric power that is consumed by system 100 when system 100 is switched off, is in a standby mode, and/or is on and operating. In embodiments, standby power 130 may be no load power consumption used by system 100 when system 100 is not active. Standby power 130 may be utilized by nonvolatile devices such as FPGA 150 to retain data even if battery 120 is turned off. Standby power 130 may be electronically coupled to general logic system 140 and field programmable gate array (FPGA) 160.

General logic system 140 may include a hardware processing device including memory, e.g., read only memory (ROM) and random access memory (RAM), storing processor-executable instructions and one or more processors that execute the processor-executable instructions. General logic system 140 may be configured to run an operating system that support's system's 100 basic functions. General logic system 140 may be electrically coupled to battery 120, standby power 130, and FPGA 150. In embodiments, general logic system 140 may not have direct access to TPM 170 or platform firmware storage 160, and may communicate data to these elements through FPGA 150.

Shielded area 155 may be a tampered resistant area on a printed circuit board associated with system 100. Shielded area 155 may be configured to prevent or reduce the risk of an attacker retrieving or modifying data stored within shielded area 155. Responsive to shielded area 155 determining that system 100 and/or FPGA 150 has been tampered with, data associated with FPGA 150 may be erased.

Field programmable gate array (FPGA) 150 may be a nonvolatile memory device positioned within shielded area 155. However, in embodiments a complex programmable logic device may be used instead of FPGA 150. One skilled in the art may appreciate that FPGA 150 may refer to a complex programmable logic device or any type of reconfigurable logic device. In embodiments, FPGA 150 may be a tamper resistant module, which can be inserted onto an existing PCB 110. FPGA 150 may be an integrated circuit designed to be configured by a user or designer after manufacturer. In embodiments, FPGA 150 may be electronically coupled with battery 120, standby power 130, general logic system 140, platform firmware storage 160, and TPM 170. FPGA 150 may be configured to store an internal secret key, intercept start up requests from general logic system 140, intercept a root of trust measurement/start up signal from TPM 170, and intercept CRTM load requests from platform firmware storage 160. Responsive to intercepting a CRTM load request from firmware 160 based on startup requests from general logic system 140, FPGA 150 may be configured to compute a cryptographic signature from the CRTM based on the internal secret key stored and determined by FPGA 150, which cannot be forged. This cryptographic signature may become a base measurement for TPM 170.

In embodiments, FPGA 150 may be permanently integrated into/onto the printed circuit board associated with system 100, and may include a physical tamper detection and deletion of existing secrete data responsive to detection of physical tampering, such as uncoupling FPGA 150 from battery 120. As such, communications between general logic system 140 and FPGA 150 may be rendered physically safe from probing by the placement of FPGA 150 in the middle layers of the printed circuit board 110 for system 100.

Furthermore, FPGA 150 may be configured to store the internal secret key in soft logic, such that the internal secret key is lost if power is removed from the FPGA 150, wherein the internal secret key may be generated immediately after programming of FPGA 150 is completed. In embodiments, FPGA 150 may be configured to utilize low power to retain data associated with the internal secret key. By coupling system 100 to a power source while replacing battery 120, the internal secret key may be stored within FPGA 150 indefinitely.

Platform firmware storage 160 may be a memory area that is configured to store firmware used to perform hardware initialization during a booting process of system 100. The firmware may also be configured to provide runtime services for operating systems and other programs. For example, the firmware may be a basic input and output system, and may be the first software system 100 runs when powered on. Responsive to general logic system 140 being initialized, platform firmware storage 160 may process CRTM load requests from a CRTM area of platform firmware storage 160 via FPGA 150. The CRTM from the CRTM area may be utilized to validate any signatures and the integrity of the firmware before or during firmware execution. Platform firmware storage 160 may be electronically coupled with FPGA 150, and may be positioned outside of shielded area 155. Therefore, FPGA 150 is positioned between platform firmware storage 160 and TPM, and platform firmware storage 160 and general logic system 140.

TPM 170 may be a secure crypto processor that is dedicated microcontroller configured to secure hardware by integrating cryptographic keys into devices. TPM 170 may be configured to communicate data to authenticate hardware and software associated within system 100. TPM 170 may be electronically coupled with FPGA 150 via buried traces.

In further embodiments, FPGA 150 and/or shielded area 155 may include a read only port 157. Read only port 157 may be configured to allow another device to read what is currently being processed by FPGA 150. In embodiments, FPGA 150 may have flash memory which stores firmware associated with the FPGA 150. Upon power on, FPGA 150 may automatically load the firmware stored in the flash memory to program its internal keys and come online. In operation, write access to the flash memory that stores the FPGA's 150 firmware may only be accessible if a write pin is set. However, the write pin immediately puts the FPGA 150 in a reset, and the firmware is reloaded from the flash memory. Once this process is completed, FPGA 150 port associated with the flash memory may be switched to a read mode, where the read only port 157 is accessible. In embodiments, responsive to setting the write pin again, the firmware may be reloaded once again.

Figure 2:
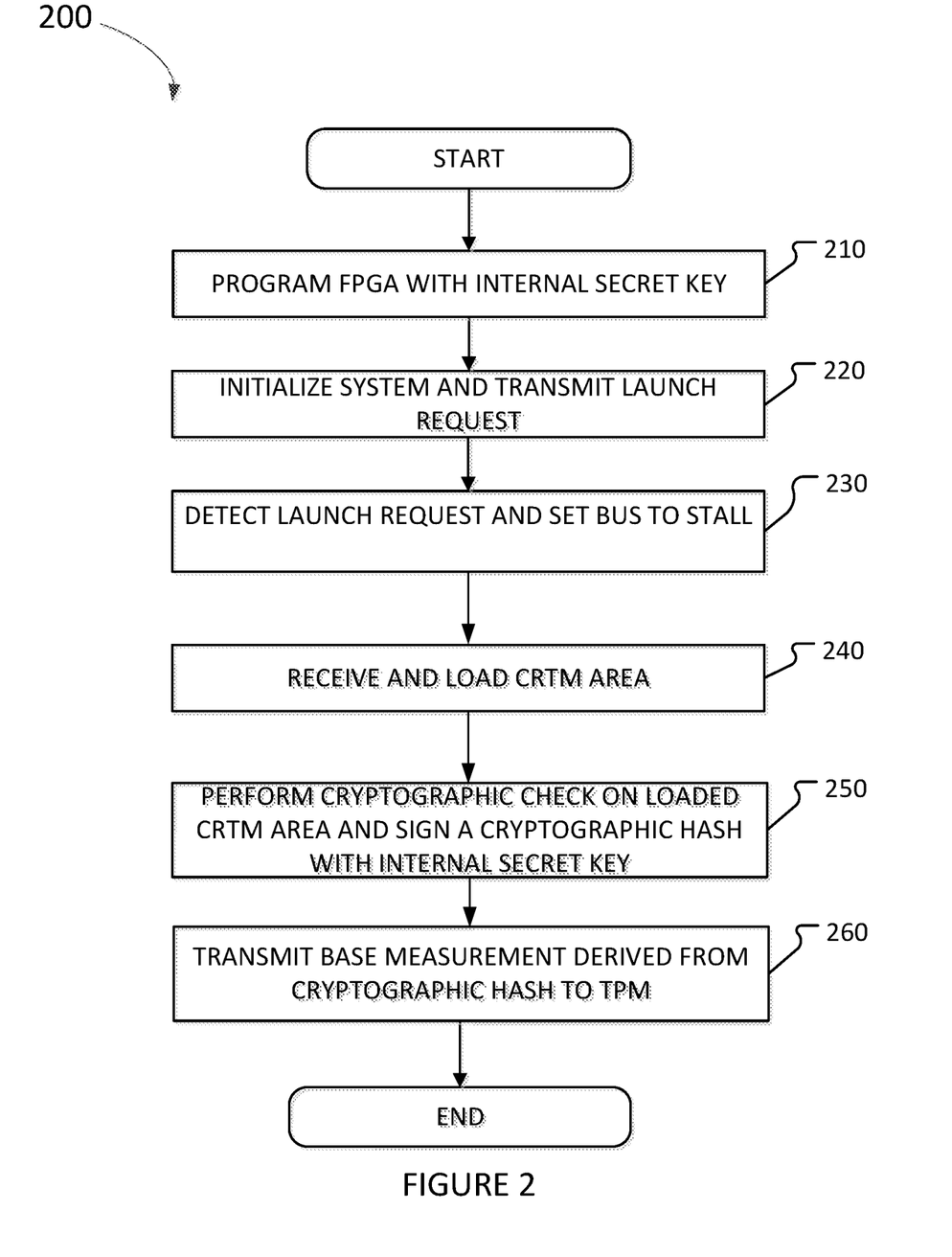
FIG. 2 depicts a method for ensuring integrity of computer system firmware while still allowing full access and reprogramming of nonvolatile storage devices with arbitrary information, according to an embodiment.

FIG. 2 illustrates a method 200 for ensuring integrity of computer system firmware while still allowing full access and reprogramming of nonvolatile storage devices with arbitrary information. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a solid-state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 200.

At operation 210, a FPGA may be programmed with an internal secret key. This internal secret key may be stored in soft-logic, which may be lost if the FPGA loses power or is removed or tampered with. Without the internal secret key a base measurement inside of the TPM may not be reproduced.

At operation 220, a general logic system may be initialized, and transmit a launch request and receive code for a reset vector, wherein the CRTM may begin at the reset vector.

At operation 230, the FPGA may detect that the general logic system transmitted a launch request, set a bus to a stall position.

At operation 240, while the FPGA holds the bus in the stalled position, the FPGA may receive and load a CRTM area from platform firmware storage within the FPGA's internal memory. Furthermore, the FPGA may intercept and ignore any write requests from the general logic system.

At operation 250, when the CRTM area is loaded into the FPGA, the FPGA may perform a cryptographic check on the loaded CRTM, by sending the CRTM to the TPM. Specifically, the CRTM may sign a cryptographic hash on the cryptographic check with the internal secret key, and load the cryptographic hash based on the internal secret key in the TPM as the base measurement.

At operation 260, the FPGA may transmit a base measurement derived from the cryptographic hash from the FPGA's internal memory as if the FPGA was the general logic system.

In implementations, once the base measurement derived by the FPGA from the cryptographic hash is transmitted, the bus may be unlocked, and sealed access to the CRTM by the general logic system may be allowed.

Figure 3:
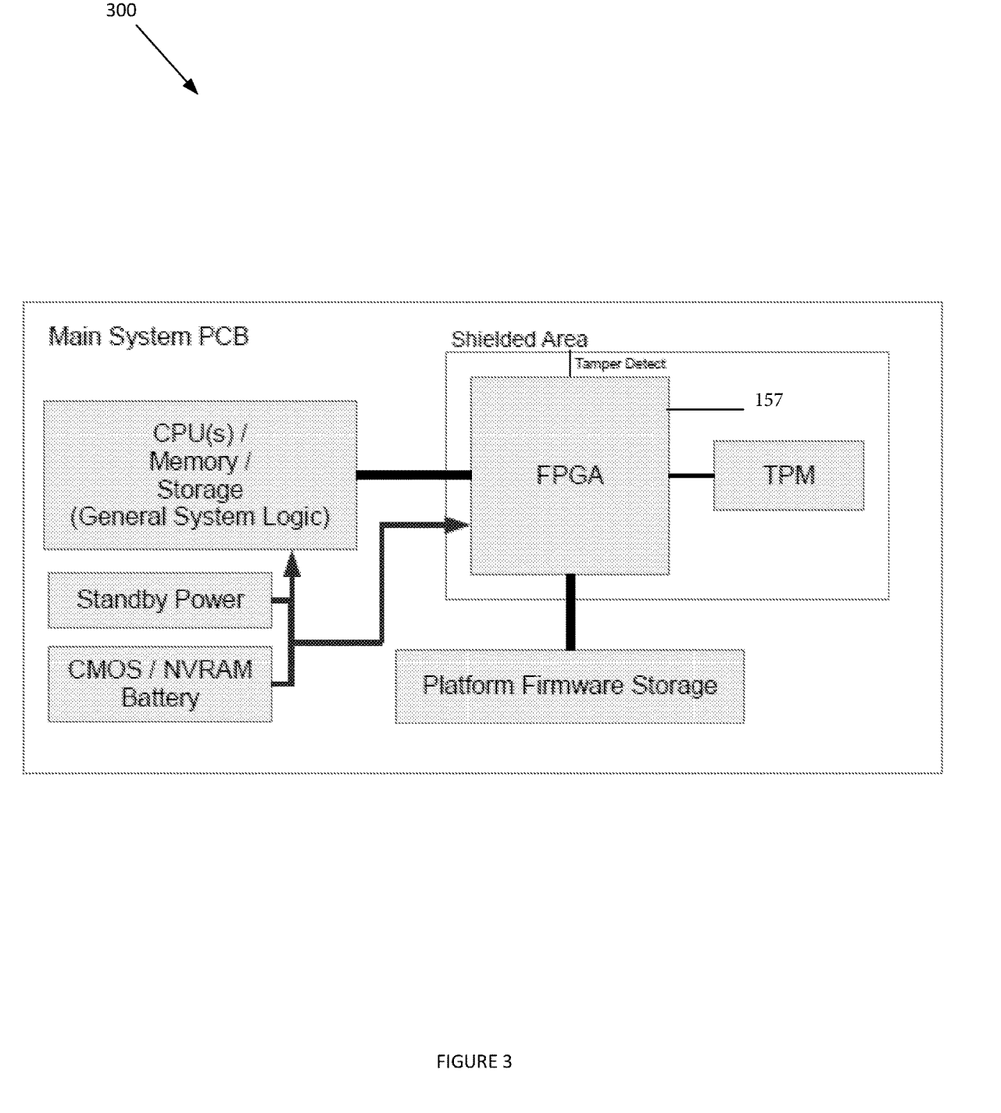
FIG. 3 depicts a topology for tamper-resistant verification system, according to an embodiment.

FIG. 3 depicts a topology for tamper-resistant verification system 300, according to an embodiment. Elements depicted in FIG. 3 may be substantially the same as described above. For the sake of brevity, a further description of these elements is omitted.

As depicted in FIG. 3, both the FPGA and the TPM may be positioned within the shielded area. The shielded area may include a tamper detect system that is configured to erase the secret internal key stored within the FPGA responsive to detecting tampering with the FPGA and/or TPM.

Figure 4:
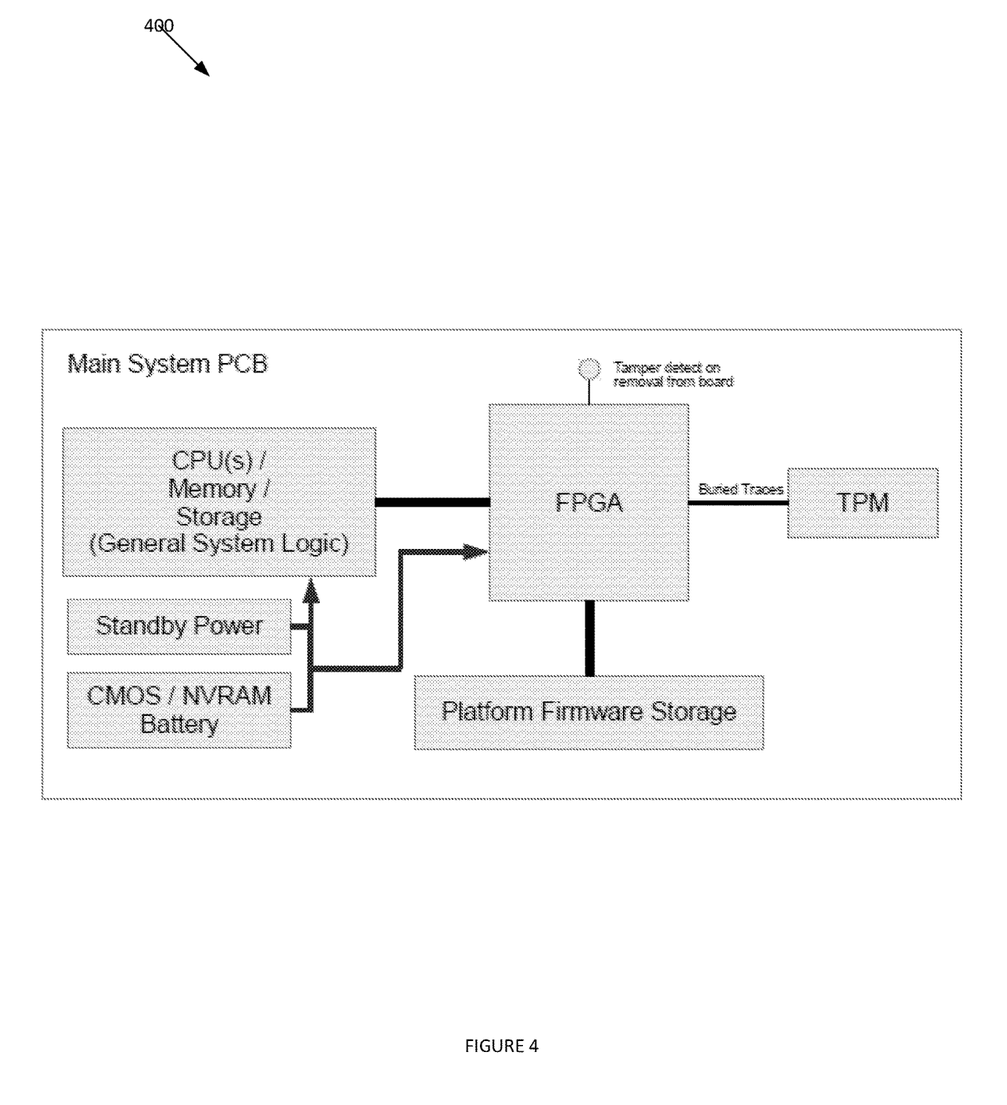
FIG. 4 depicts a topology for tamper-resistant verification system, according to an embodiment.

FIG. 4 depicts a topology for tamper-resistant verification system 400, according to an embodiment. Elements depicted in FIG. 4 may be substantially the same as described above. For the sake of brevity, a further description of these elements is omitted.

As depicted in FIG. 4, the FPGA and TPM may not be positioned within a shielded area. However, the FPGA may be coupled to a tamper detect system, which may be configured to erase data stored within the FPGA responsive to removing the FPGA from the PCB.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention.

Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable content may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

The flowcharts and block diagrams in the flow diagrams illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagrams.

The invention claimed is:

1. A system for tamper-resistant verification of firmware, the system comprising:
    platform firmware storage that is configured to store firmware used to perform hardware initialization during a booting process;
    a shielded area configured to be a tamper resistant area, wherein the shielded area is positioned electronically between a general logic system and the platform firmware storage; and
    a reconfigurable logic device being electronically and physically positioned in the shielded area, the reconfigurable logic device being configured to perform a cryptographic operation on the platform firmware storage that is positioned outside of the shielded area, wherein the reconfigurable logic device transmits a root of trust measurement to a tamper resistant logic device and signs a root of trust measurement with a cryptographic hash based on the firmware, wherein platform configuration registers are loaded with the signed root of trust measurement.

2. The system of claim 1, wherein the reconfigurable logic device includes an internal secret key.

3. The system of claim 2, wherein the reconfigurable logic device is configured to compute a cryptographic signature, wherein the cryptographic signature is a base measurement for the root of trust measurement.

4. The system of claim 1, wherein an internal secret key is stored in soft logic that is removed from the reconfigurable logic device if power is lost.

5. The system of claim 1, wherein the reconfigurable logic device is a nonvolatile memory device.

6. A method associated with tamper-resistant verification of firmware, the method comprising:
    storing firmware used to perform hardware initialization during a boot process on platform firmware storage;
    forming a shielded area that is a tamper resistant area electronically between a general logic system and the platform firmware storage;
    electronically and physically positioning a reconfigurable logic device in the shielded area;
    performing, by the reconfigurable logic device, a cryptographic operation on the platform firmware storage that is positioned outside of the shielded area;
    transmitting, by the reconfigurable logic device, a root of trust measurement to a tamper resistant logic device;
    signing, by the reconfigurable logic device, a root of trust measurement with a cryptographic hash, wherein the cryptographic hash is based on the firmware; and
    loading the signed root of trust measurement within platform configuration registers.

7. The method of claim 6, further comprising:
    storing an internal secret key within the reconfigurable logic device.

8. The method of claim 7, further comprising:
    computing, by the reconfigurable logic device, a cryptographic signature, wherein the cryptographic signature is a base measurement for the root of trust measurement.

9. The method of claim 6, further comprising:
    storing an internal secret key in soft logic that is removed from the reconfigurable logic device if power is lost.

10. The method of claim 6, wherein the reconfigurable logic device is a nonvolatile memory device.

* * * * *